US006798417B1

(12) United States Patent
Taylor

(10) Patent No.: US 6,798,417 B1
(45) Date of Patent: Sep. 28, 2004

(54) JUST IN TIME GRAPHICS DISPATCHING

(75) Inventor: Andrew Kent Taylor, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/404,274

(22) Filed: Sep. 23, 1999

(51) Int. Cl.$^7$ .................................................. G06F 15/16
(52) U.S. Cl. ....................................................... 345/502
(58) Field of Search ................................. 345/733, 419, 345/559, 619, 503, 744, 441, 506, 421, 502; 709/203, 100, 202, 219, 318, 220, 229, 105, 228, 226, 328; 713/201; 711/147

(56) References Cited

U.S. PATENT DOCUMENTS

| 5,553,239 A | * | 9/1996 | Heath et al. ................. 713/201 |
| 5,734,874 A | | 3/1998 | Van Hook et al. ........... 395/513 |
| 5,737,549 A | | 4/1998 | Hersch et al. ............... 395/309 |
| 5,815,156 A | | 9/1998 | Takeuchi ..................... 345/419 |
| 5,844,553 A | | 12/1998 | Hao et al. .................... 345/329 |
| 6,182,127 B1 | * | 1/2001 | Cronin, III et al. .......... 709/219 |
| 6,192,388 B1 | * | 2/2001 | Cajolet ........................ 709/100 |
| 6,282,560 B1 | * | 8/2001 | Eilert et al. ................. 709/100 |

* cited by examiner

Primary Examiner—Matthew C. Bella
Assistant Examiner—Dalip K. Singh
(74) Attorney, Agent, or Firm—Duke W. Yee; Robert M. Carwell; Stephen J. Walder, Jr.

(57) ABSTRACT

A method for rendering graphics on a server. In a preferred embodiment, a server receives a request from a requesting device for graphics. The server determines the fastest available rendering resource and dispatches the request to this fastest available rendering resource. Once the graphics have been rendered, the server sends the graphics to the requesting device for presentation to a user.

19 Claims, 4 Drawing Sheets

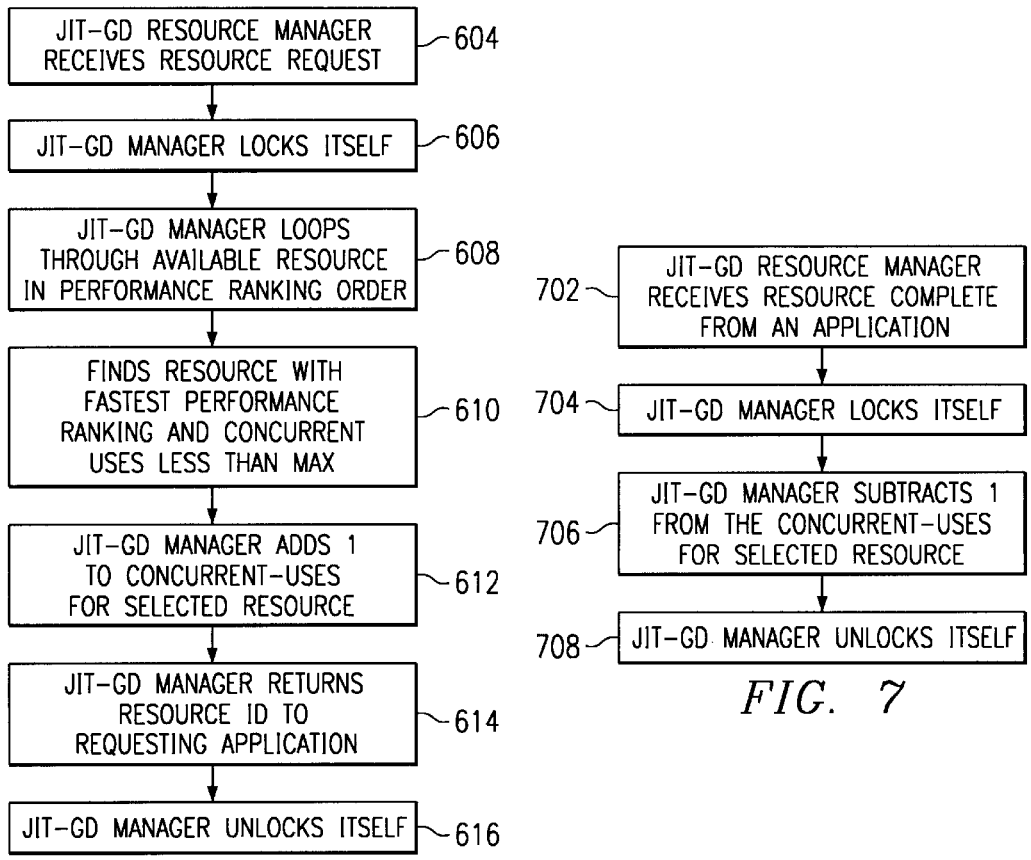

JUST IN TIME GRAPHICS DISPATCHING

BACKGROUND OF THE INVENTION

1. Technical Field

The present invention relates to the field of computer software and, more particularly, to methods of rendering three dimensional graphics on a rendering server.

2. Description of Related Art

Traditionally, three dimensional (3D) graphics technology has been limited to use mainly on client computers (i.e., computers on an end users desk). However, several trends are emerging that are driving 3D graphics into the server domain.

One trend driving 3D graphics into the server domain is the increasing size of 3D graphics rendering jobs. For example, visualizing the seismic data for large oil fields involves a vast amount of data and processing power. Thus, to handle jobs of this sort requires very large and expensive graphics computers. These types of systems may be for example, greater than $100,000 per computer. It is not practical to have computers of this sort on every user's desk. Instead, the industry is looking toward 3D rendering servers as a method to solve the problem. In this manner, the 3D graphical images are generated on the server, utilizing its enormous computing resources, with the resulting image distributed to the end users for display on the end user's computer.

A second trend driving 3D graphics into the server domain is "casual viewing" of 3D graphics. There is a large class of users that need to view 3D graphical images, but do not need to design, edit, or "fly through" the 3D graphical image. These people include managers, finance planners, and shop floor workers. It is not practical to provide 3D graphics hardware to every user that needs to do "casual viewing." Instead, the industry is looking to 3D rendering servers as a method to solve this problem.

One problem with the move towards 3D rendering servers is that very little work has been done on 3D rendering servers. Instead, the industry currently takes standard workstation systems and use these systems as 3D graphics rendering servers. However, workstations are designed to be used by one person at a time, not by many people. However, servers need to perform several functions at once for many different users. Thus, when a workstation is converted into a 3D graphics rendering server, its function and design tend toward performing one graphics job at a time. This severely limits the scalability (i.e. ability to handle many concurrent tasks) and overall power of the 3D graphics rendering server.

Therefore, it is desirable to have a method and apparatus to more efficiently utilize resources of 3D graphics rendering servers.

SUMMARY OF THE INVENTION

The present invention provides a method for rendering graphics on a server. In a preferred embodiment, a server receives a request from a requesting device for graphics. The server determines the fastest available rendering resource and dispatches the request to this fastest available rendering resource. Once the graphics have been rendered, the server sends the graphics to the requesting device for presentation to a user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts a flowchart illustrating selecting a graphics resource in response to a request for a new resource in accordance with a preferred embodiment of the present invention;

FIG. 7 depicts a flowchart illustrating a method for releasing a resource when an application is completed with it in accordance with a preferred embodiment of the present invention; and FIG. 8 depicts a block diagram comparing a generic application flow without utilizing JIT-GD and with JIT-GD.

DETAILED DESCRIPTION OF THE PREFERRED EMBODIMENT

Figure 1:
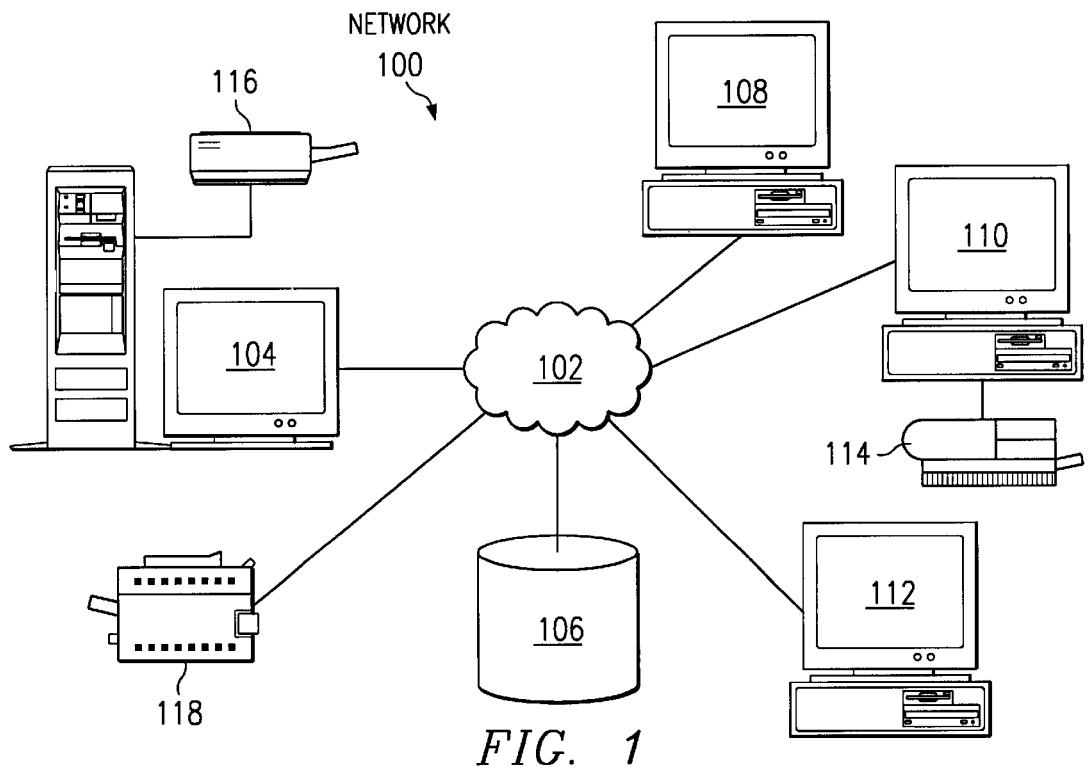
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network which receives a program or other application from another computer coupled to the network. In the depicted example, server 104 provides data, such as boot files, operating system images and applications, to clients 108–112. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
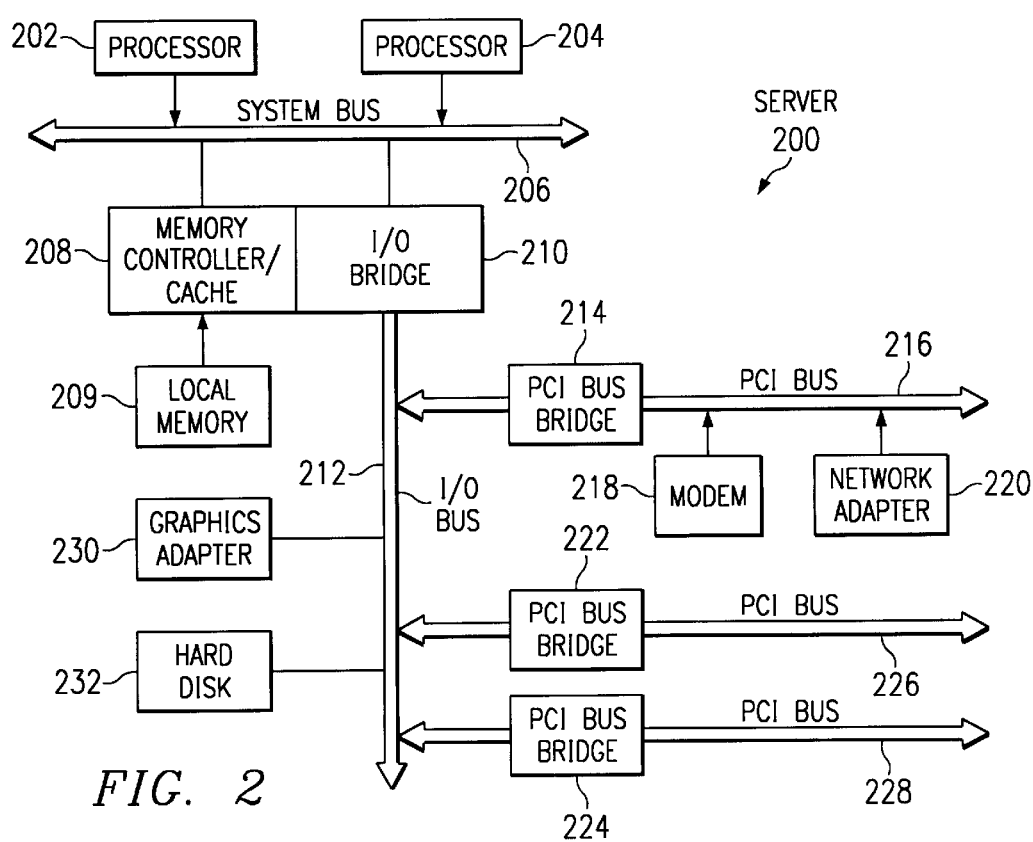
FIG. 2 depicts a block diagram of a data processing system which may be implemented as a server and in which the present invention may be implemented.

Referring to FIG. 2, a block diagram of a data processing system which may be implemented as a rendering server, such as server 104 in FIG. 1, in which the present invention may be implemented is illustrated. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RS/6000, a product of International Business Machines Corporation in Armonk, N.Y., running the Advanced Interactive Executive (AIX) operating system.

Figure 3:
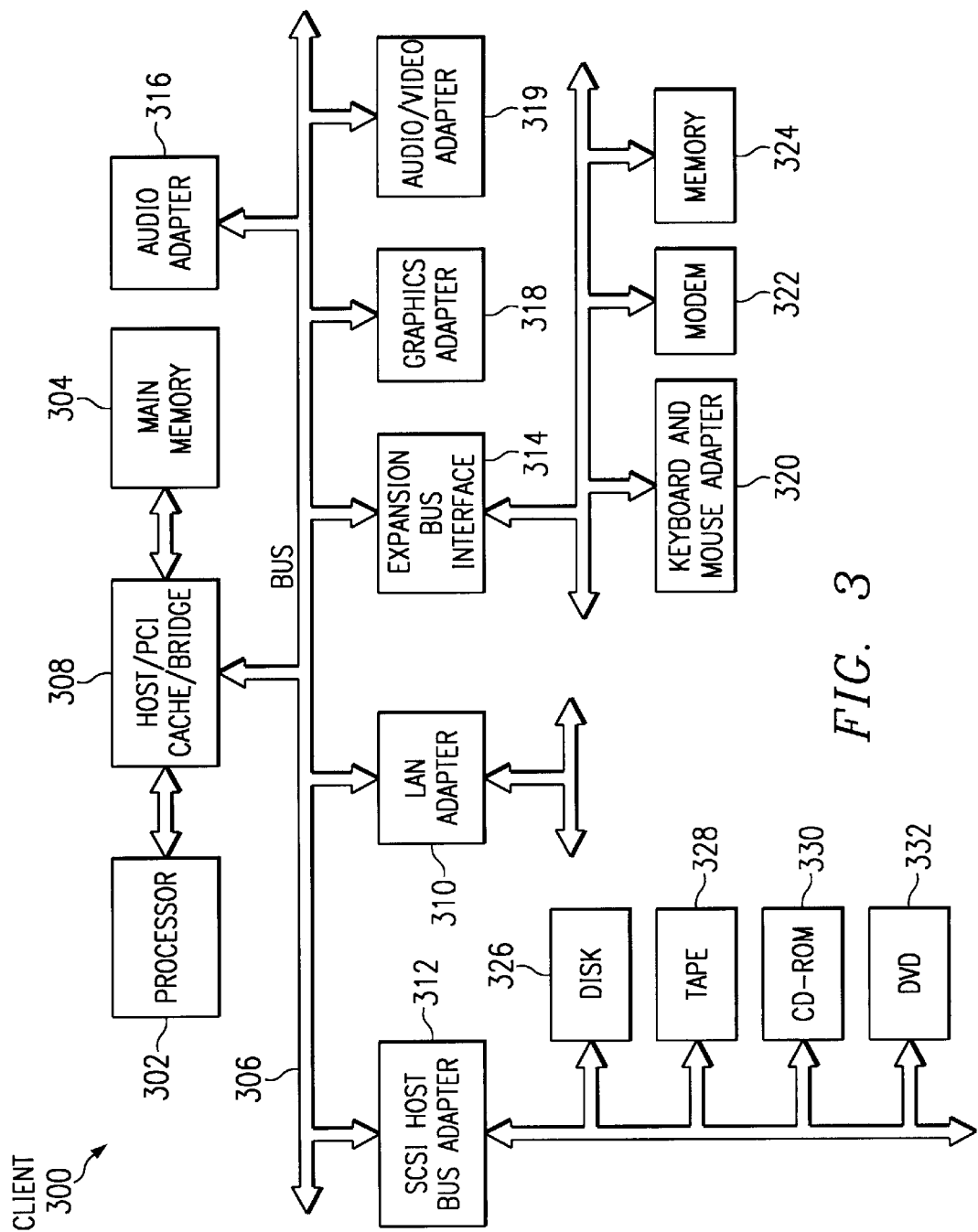
FIG. 3 illustrates a block diagram of a data processing system that may be implemented as a client in accordance with the present invention.

With reference now to FIG. 3 a block diagram of a data processing system which may be implemented as a client in accordance with the present invention is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
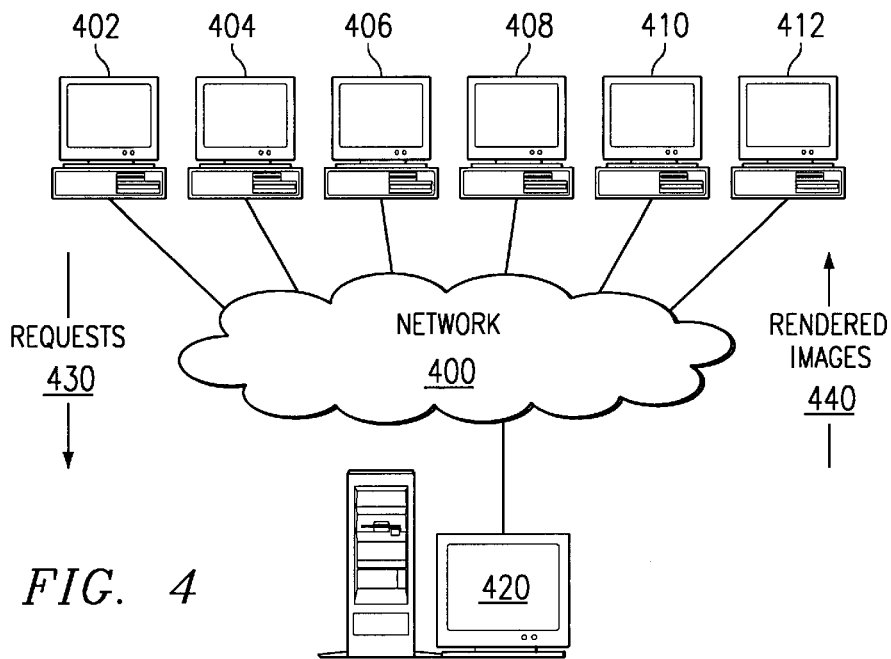
FIG. 4 depicts a block diagram illustrating how a rendering server is typically used in accordance with the present invention.

Turning now to FIG. 4, a block diagram illustrating data flow to and from a rendering server is depicted in accordance with the present invention. A rendering server 420 is typically a network 400 accessible device that is constantly listening for rendering requests. Rendering screen 420 may be implemented using a computer such as data processing system 200 in FIG. 2. It functions similarly to a web server that is constantly listening for HTTP requests. The network 400 can be the Internet, but other types of networks may also be used such as, for example, a token ring, the Ethernet, a private local area network (LAN), a virtual private network (VPN), or a public wide area network (WAN). Furthermore, the present invention may be implemented as an interprocess communication on the rendering server itself. The clients 402, 404, 406, 408, 410, and 412 may be anything that can make a request 430 to server 420. For example, the client, such as one of clients 402, 404, 406, 408, 410, and 412, may be a browser, a standalone client side application, or another server based application. Once server 420 renders the images, the images are returned 440 to the requesting client.

Figure 5:
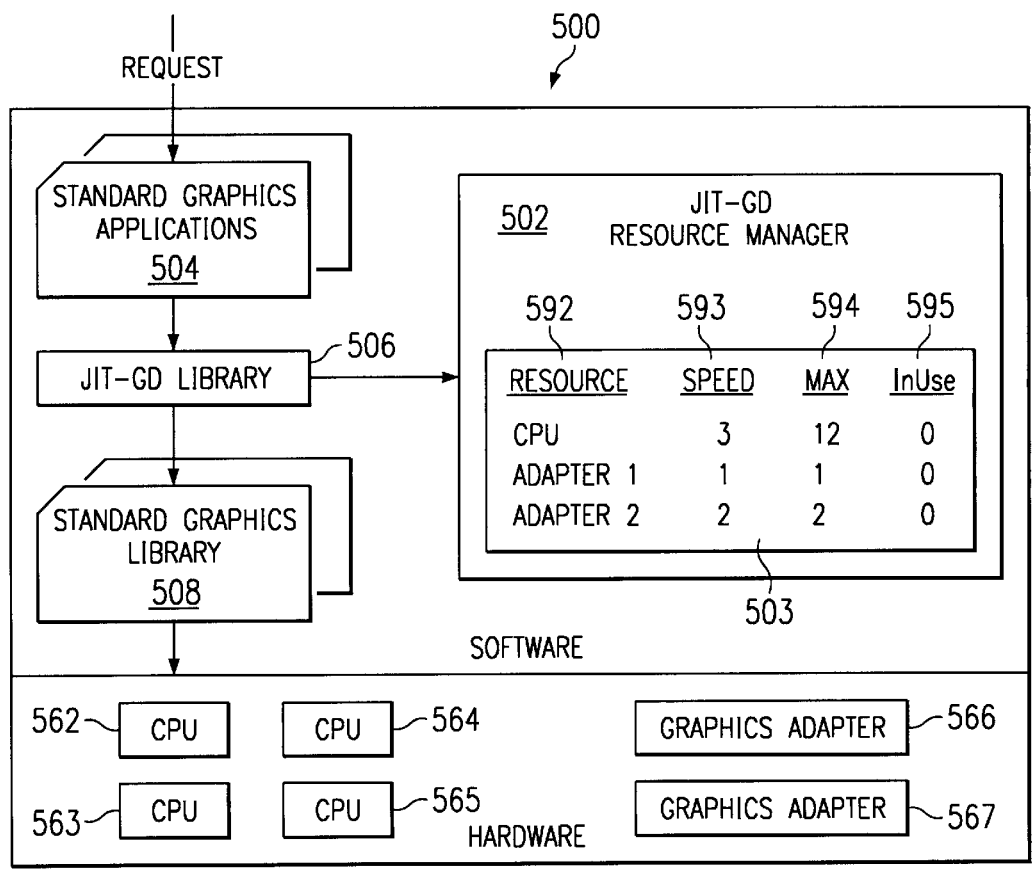
FIG. 5 depicts a block diagram showing more detail about the graphics rendering components within a rendering server such as server 200 in accordance with a preferred embodiment of the present invention.

Turning now to FIG. 5, a block diagram showing more detail about the graphics rendering components within a rendering server such as server 200 is depicted in accordance with a preferred embodiment of the present invention. Currently, there are many graphics applications available to users and each of them is written to some sort of graphics application programming interface (API) such as, for example, X, GL, OpenGL, Direct3D, and Java3D. The present invention provides an infrastructure to allow existing applications to become "better" rendering server application without significant changes to the original application. By "better", it is meant that the applications are able to exploit what is typically a large server machine. This includes taking advantage of multiple high-speed graphics adapters that can be installed concurrently or multiple CPUs in a large SMP system. For example two GXT3000P graphics adapters in a RS/6000 43P 260 server. However, typically, client side graphics applications are not designed to exploit either of these scenarios.

The Just In Time Graphics Dispatching (JIT-GD) technology of the present invention provides the infrastructure to allow client side graphics applications to exploit the capabilities of servers. It is referred to as Just In Time Graphics Dispatching because it "dispatches" requests to the fastest available resource, making that decision at the request time (i.e. just in time). The JIT-GD mechanism of the present invention has two main components in the depicted example. These components are the JIT-GD library 506 and the JIT-GD resource manager 502.

JIT-GD resource manager 502 is in charge of monitoring, tracking, and assigning available graphics resources 562–567, in the system 500. JIT-GD resource manager 502 runs as a separate process on the 3D rendering server 500. Based on a configuration file, JIT-GD resource manager 502 creates an internal table 503 of available rendering resources 592 and their characteristics. Characteristics include, for example, a performance ranking 593, maximum concurrent users 594, current concurrent users 595, and perhaps other things worth tracking such as average response time and usage frequency. The performance ranking 593 and concurrent user 594, 595 characteristics are key when it comes time to assign graphics resources.

The JIT-GD library 506 is a software library that sits between the applications library 504 and the standard graphics library 508. JIT-GD library 506 has two main tasks. The first task performed by the JIT-GD library 506 is managing the creation of multiple graphics context for each single graphics context that the application from the applications library 504 requests. It should be noted that this process is different for different graphics libraries. For example, with OpenGL, the JIT-GD library 506 creates an X-window and an OpenGL context for each graphics resource. The second task performed by JIT-GD library 506 is requesting rendering resources from JIT-GD resource manager 502.

Turning now to FIG. 6, a flowchart illustrating selecting a graphics resource in response to a request for a new resource is depicted in accordance with a preferred embodiment of the present invention. First the JIT-GD resource manager 502 receives a request for a new resource (step 604). JIT-GD manager 502 locks itself, i.e., other requests are blocked (step 606), and then JIT-GD resource manager 502 loops through the available resources 592 in order of performance ranking 593 (i.e., 1 through N) (step 608). JIT-GD resource manager 502 finds the resource 592 with the fastest performance ranking 593 and with the number of concurrent uses 595 less than the maximum number of concurrent uses 594 tolerated by the resource (step 610). Note, if no available resource is found, then JIT-GD resource manager 502 will block until a resource is available, and then will continue to the next step. Once a resource is selected, JIT-GD resource manager 502 adds 1 to the concurrent-uses counter 595 for the selected resource (step 612). JIT-GD resource manager 502 then returns the resource identity to the requesting application (step 614) and then unlocks itself so that it is ready for new requests (step 616).

Turning now to FIG. 7, a flowchart illustrating a method for releasing a resource when an application is completed with it is depicted in accordance with a preferred embodiment of the present invention. JIT-GD resource manger 502 receives a resource complete notification from an application (step 702). JIT-GD resource manager 502 then locks itself so that other requests are blocked (step 704). JIT-GD resource manager 502 then subtracts 1 from the concurrent-uses 595 for the selected resource (step 706) and then unlocks itself (step 708) so that it is ready for new requests.

Turning now to FIG. 8, a block diagram comparing a generic application flow without utilizing JIT-GD and with JIT-GD is depicted. Application flow 800 illustrates a typical application flow without utilizing JIT-GD. First, an initialization 802 occurs by the initializing the application 804 and then creating a graphics context 806. Next, the application waits for a request 808.

After waiting for the request 808, the server gets the request 812 and selects a graphics window 814. Next, the graphics window is cleared 816 and the graphics are drawn 818. The newly drawn image is read back 820 and the result sent to the client 822. The server then wait for a new request 824.

In contrast to the non JIT-GD approach, the points where JIT-GD is utilized can be seen by referring to application flow 826 as illustrated in FIG. 8. JIT-GD library 506 creates a context for each graphic 830 at the point in the flow corresponding to creating a graphics context 806. When the non JIT-GD flow selects a graphics window is the point in the flow in which the JIT-GD manager 502 selects the fastest available graphics resource 836. The point in the flow in which the image is read back 820 is the point at which the JIT-GD manager 502 de-selects the graphics resource 834.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for rendering graphics on a server, comprising the computer implemented steps of:

maintaining a table containing a list of rendering resources available to the server, wherein the list includes a maximum number of concurrent users and a current number of users;

receiving, at a server, a request from a requesting device for graphics;

identifying a fastest available rendering resource whose current number of users is less than the maximum number of concurrent users based on the list of rendering resources;

dispatching the request to the fastest available rendering resource; and sending the graphics to the requesting device for presentation to a user.

2. The method as recited in claim 1, wherein the list includes information about the speed of each of said rendering resources.

3. The method of claim 1, wherein the list further includes an average response time for each rendering resource.

4. The method of claim 1, wherein the list further includes a usage frequency for each rendering resource.

5. The method of claim 1, wherein the request from the requesting device is received by a Just-in-Tune Graphics Dispatcher library, the Just-in-Time Graphics Dispatcher library sends a request for a rendering resource to a Just-in-Time Graphics Dispatcher resource manager, and Wherein the Just-in-Time Graphics Dispatcher resource manager performs the steps of identifying, dispatching and sending in response to receiving the request for a rendering resource from the Just-in-Time Graphics Dispatcher resource library.

6. A computer program product in computer readable media for use in a data processing system for rendering graphics on a server, the computer program product comprising:

first instructions for maintaining a table containing a list of rendering resources available to the server, wherein the list includes a maximum number of concurrent users and a current number of users;

second instructions for receiving, at a server, a request from a requesting device for graphics;

third instructions for identifying a fastest available rendering resource whose current number of users is less than the maximum number of comment users based on the list of rendering resources;

fourth instructions for dispatching the request to the fastest available rendering resource; and fifth instructions for sending the graphics to the requesting device for presentation to a user.

7. The computer program product as recited in claim 6, wherein the list includes information about the sped of each of said rendering resources.

8. The computer program product of claim 6, wherein the list further includes an average response time for each rendering resource.

9. The computer program product of claim 6, wherein the list further includes a usage frequency for each rendering resource.

10. A system for rendering graphics on a server, comprising:

means for maintaining a table containing a list of rendering resources available to the server, wherein the list includes a maximum number of concurrent users and a current number of users;

means for receiving, at a server, a request from a requesting device for graphics;

means for identifying a fastest available rendering resource whose current number of users is less than the maximum number of concurrent users based on the list of rendering resources;

means for dispatching the request to the fastest available rendering resource; and means for sending the graphics to the requesting device for presentation to a user.

11. The system as recited in claim 10, wherein the list includes information about the speed of each of said rendering resources.

12. The system of claim 10, wherein the list further includes an average response time for each rendering resource.

13. The system of claim 10, wherein the list further includes a usage frequency for each rendering resource.

14. A computer network, comprising;

a rendering server comprising a plurality of rendering resources; and a plurality of client machines; wherein the rendering server receives requests for graphics from the client machines; and the rendering server utilizes the fastest available rendering resource from the plurality of rendering resources to generate the requested graphics, wherein the rendering server identifies the fastest available rendering resource based on a table containing a list rendering resources, a maximum number of concurrent users for each rendering resource, and a current number of users for each rendering resource.

15. The computer network of claim 14, wherein the list farther includes an average response time for each rendering resource.

16. The computer network of claim 14, wherein the list further includes a usage frequency for each rendering resource.

17. A graphics rendering server, comprising:

a plurality of applications;

a plurality of rendering resources; and a resource manager; wherein the resource manager determines a fastest rendering resource from said plurality of rendering resources on which to process a request for graphics utilizing one of said plurality of applications, wherein the resource manager determines the fastest rendering resource based on a table containing a list of rendering resources, a maximum number of concurrent users for each rendering resource, and a concurrent number of users for each rendering resource.

18. The graphics rendering server of claim 17, wherein the list further includes an average response time for each rendering resource.

19. The graphics rendering server of claim 17, wherein the list further includes a usage frequency for each rendering resource.

* * * * *

UNITED STATES PATENT AND TRADEMARK OFFICE
CERTIFICATE OF CORRECTION

PATENT NO. : 6,798,417 B1
DATED : September 28, 2004
INVENTOR(S) : Taylor

It is certified that error appears in the above-identified patent and that said Letters Patent is hereby corrected as shown below:

Column 7,
Line 20, after "received by a" delete "Just-in-Tune" and insert -- Just-in-Time --.
Line 24, before "the" delete "Wherein" and insert -- wherein --.
Line 41, after "number of." delete "comment" and insert -- concurrent --.
Line 48, after "about the", delete "sped" and insert -- speed --.

Column 8,
Line 34, before "includes" delete "farther" and insert -- further --.

Signed and Sealed this

Thirteenth Day of September, 2005

JON W. DUDAS
*Director of the United States Patent and Trademark Office*